United States Patent [19]

Konno et al.

[11] Patent Number: 4,733,066
[45] Date of Patent: Mar. 22, 1988

[54] DEVICE FOR CONTROLLING THE MOVEMENT OF A FOCAL POINT OF A LIGHT BEAM USED FOR DETECTING RECORDED INFORMATION

[75] Inventors: Yoshikiyo Konno; Takashi Suzuki, both of Tokorozawa, Japan

[73] Assignee: Pioneer Electronic Corporation, Tokyo, Japan

[21] Appl. No.: 915,896

[22] Filed: Oct. 6, 1986

Related U.S. Application Data

[63] Continuation of Ser. No. 523,789, Aug. 16, 1983, abandoned.

[30] Foreign Application Priority Data

Aug. 17, 1982 [JP] Japan .............................. 57-124256[U]

[51] Int. Cl.⁴ ................................................ G01J 1/20
[52] U.S. Cl. ....................................... 250/201; 369/45
[58] Field of Search ................... 250/201, 204; 369/43, 369/44, 45, 46

[56] References Cited

U.S. PATENT DOCUMENTS

| | | | |
|---|---|---|---|
| 3,952,191 | 4/1976 | Tinet | 250/201 |
| 4,286,147 | 8/1981 | Tsuboi et al. | 250/201 |
| 4,317,991 | 3/1982 | Stauffer | 250/201 AF |
| 4,446,546 | 5/1984 | Miller | 250/201 |
| 4,512,003 | 4/1985 | Kimura et al. | 250/201 |
| 4,636,625 | 1/1987 | Emoto et al. | 250/201 DF |

Primary Examiner—David C. Nelms
Assistant Examiner—William L. Oen
Attorney, Agent, or Firm—Fleit, Jacobson, Cohn & Price

[57] ABSTRACT

A device for controlling the movement of a focal point of a light beam for detecting recorded information on a recording medium, comprises a focus actuator connected to a focal lens for focusing the light beam on the recording medium, a drive amplifier for generating a drive current of the focus actuator, a photo detector for generating a focus error signal, a starting signal generating means for generating a starting signal, and a switching means for selectively applying either the focus error signal or the starting signal to the drive amplifier. The circuit construction and the stability of the operating characteristic are simplified by using a ramp signal whose level increases with time, as the starting signal.

3 Claims, 5 Drawing Figures

4,733,066

DEVICE FOR CONTROLLING THE MOVEMENT OF A FOCAL POINT OF A LIGHT BEAM USED FOR DETECTING RECORDED INFORMATION

This application is a continuation of application Ser. No. 523,789, filed Aug. 16, 1983, now abandoned.

BACKGROUND OF THE INVENTION

1. Field of the Invention

The present invention relates to a device for controlling the movement of a light spot of a light beam of a system for reading out recorded information, and more specifically to a device which controls the movement of the light spot during a period for starting an operation of a focus servo system.

2. Description of Background Information

In an optical system for recording and reading out recorded information, a read out laser beam is applied on the surface of a recording disc which is used as a recording medium. Since the recorded information is picked up by reflection of the read out laser beam or by transmitted light of the read out laser beam, it is necessary to accurately focus the light spot of the read out laser beam on the recording surface of the recording disc. Therefore, a focus servo system, which controls the position of a focal lens in accordance with a focus error signal, is generally attached to the optical recording and read out system.

In the focus servo system, the magnitude of the focus error signal becomes equal to zero when the focal lens is positioned at an in-focus position which causes the light spot passing through the focal lens to correctly converge on the recording surface of the recording disc. Assume that the distance between the focal lens and the recording surface in the above state is expressed $D_o$, the magnitude and the sign of the focus error signal varies in such a manner that the magnitude substantially increases in proportion to the deviation of the distance from the value $D_o$, and the sign of the focus error signal changes depending on the direction of the deviation from the in-focus position. In short, the focus error signal has a so-called S curve characteristic having a center at the distance of $D_o$.

In accordance with this focus error signal, a motor is driven to move the focal lens up and down along a direction perpendicular to the surface of the recording disc. With this operation of the focus servo system, the focal lens is correctly moved to maintain the proper distance between the focal lens and the recording surface regardless of any deformation of the recording disc or other structural errors which cause the up and down movement of the recording surface for each revolution of the recording disc.

Furthermore, prior to the start of reading the recorded information, the focal lens is placed at a position furthest away from the recording surface, in which the distance between the focal lens and the recording surface is the greatest and larger than the value $D_o$. In this state, the generation of the focus error signal is not possible since the light spot of the read out laser beam is not focused on the recording surface. Therefore, the focus servo system must be operated under an open loop control in which the movement of the focal lens is controlled by a signal other than the focus error signal.

Accordingly, it is necessary to provide a starting signal which moves the focal lens down until the distance between the focal lens and the recording surface becomes near the value $D_o$. After the focal lens has approximately reached position $D_o$, the focus servo system will be operated under a closed loop operation in which the position of the focal lens is adjusted according to the focus error signal.

However, in conventional arrangements, there is a drawback in that a circuit for generating this starting signal is rather complicated. Furthermore, the operating characteristic of the circuit is subjected to changes due to the temperature characteristics of the circuit elements. Therefore, an adjustment of the operating characteristic of this circuit is difficult and troublesome.

SUMMARY OF THE INVENTION

An object of the present invention is therefore to provide a device for controlling a position of a focal point of a light beam of an optical information read out system, which has relatively simple circuit construction and the stability of the operation is improved.

Another object of the present invention is to provide a device in which the adjustment of the operating characteristic is facilitated.

According to the present invention, a device for controlling a focal point of a light beam for detecting recorded information, includes a focus actuator for holding, along with a resilient member, a focal lens through which the light beam is applied on a recording medium and moving the focal lens in accordance with a drive signal, and switching means for opening a focus serve loop for moving the focal lens to a normal operating position upon receipt of a 'focusing-on' signal, characterized by means for producing a signal whose level increases with time as the drive signal of the focus actuator.

According to another aspect of the invention, a device for controlling a focal point of a light beam for detecting recorded information, to be incorporated in an optical system for recording and reading out information including a focal lens for focusing the light beam on a recording medium, comprises a photo detector for detecting the light beam from a recording medium and producing a focus error signal, a focus actuator including a drive coil connected to the focal lens, a drive amplifier for producing a drive current for the focus actuator in proportion to the level of an input signal, a starting signal generating means responsive to a 'focusing-on' signal for generating a starting signal whose level increases with time after receipt of the 'focusing-on' signal, and a switching means for selectively applying either the focus error signal or the starting signal to the drive amplifier as the input signal.

According to a further aspect of the invention, the switching means comprises a comparator for receiving the focus error signal and a reference level and producing an output signal when the level of the focus error signal becomes lower than the reference level, a switch circuit connected to an input circuit of the drive amplifier, for selecting the starting signal when the output signal of the comparator is not present, and selecting the focus error signal when the output signal of the comparator is present.

According to another aspect of the invention, the starting signal generating means comprises a charge-discharge circuit connected to a current source via a switch, and a set-reset flip flop circuit connected to the switch and receiving the "focusing-on" signal at a set input and receiving the output signal of the comparator at a reset input which closes the switch to charge the charge-discharge circuit upon receipt of the "focusing-on" signal, and opens the switch to discharge the charge-discharge circuit when the output signal of the comparator is applied.

Further scope of applicability of the present invention will become apparent from the detailed description given hereinafter. However, it should be understood that the detailed description and specific examples, while indicating a preferred embodiment of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects and advantages of the invention will become more clearly understood from the following description taken in conjunction with the accompanying drawings which are given by way of illustration only, and thus are not limitative of the present invention, and wherein.

DETAILED DESCRIPTION OF A PREFERRED EMBODIMENT

Figure 1:
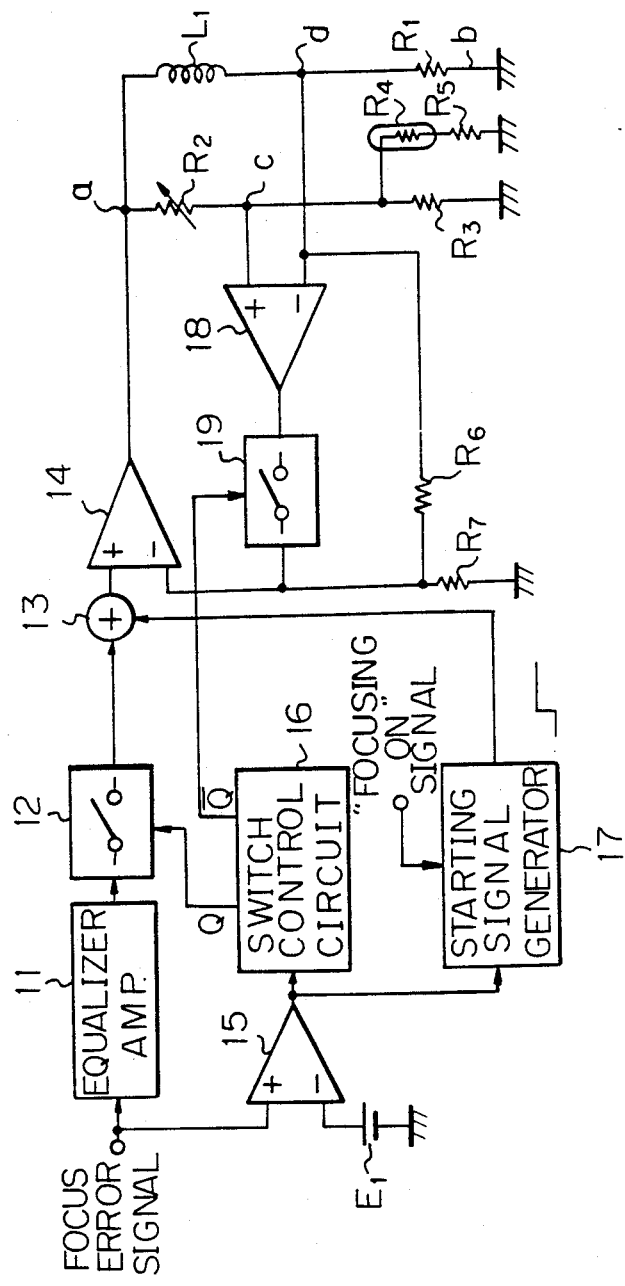
FIG. 1 is a block diagram of a conventional device for controlling the movement of a focal lens.

Before entering into the explanation of the embodiment of the invention, reference is first made to FIG. 1 which is an example of a conventional focus servo system which incorporates a device for controlling a starting period of the driving of the focal lens.

As shown, a focus error signal from a photo detector is applied to an equalizer amplifier 11. An output signal of the equalizer 11 is then applied to a drive amplifier 14 via a servo loop control switch 12 and a positive input terminal of an adder circuit 13. A drive coil $L_1$ of a focal lens (not shown) is actuated by way of an output signal of this drive amplifier 14. The focus error signal is also applied to a positive input terminal of level comparator 15 which produces an output signal when the level of the focus error signal is lower than a predetermined reference level $E_1$ which is applied to a negative input terminal of the comparator. The output signal of the level comparator 15 is then applied to a switch control circuit 16 as a trigger signal. The switch control circuit 16 produces a pair of complementary output signal Q and $\bar{Q}$. The output signal Q is applied to the servo loop switch 12 so as to control the open and close operation of the servo loop switch 12. A starting signal generating circuit 17 is also provided to receive the output signal of the level comparator 15 and to control the generation of the starting signal which is also applied to the drive amplifier 14 via the adder circuit 13. The starting signal generation circuit also receives a 'focusing-on' signal which is generated at the beginning of the operation of the optical recording and read out system.

A plurality of resistors $R_1$ through $R_5$ is provided to form a bridge circuit together with the drive coil $L_1$ of the focal lens. A thermistor $R_4$ is connected in series with the resistor $R_5$ to form a series circuit for temperature compensation. The series circuit is connected in parallel with the resistor $R_3$ which acts as a shunt resistor of the bridge circuit. A drive current from the driving amplifier 14 is applied to a pair of junctions a and b (grounded in this case) of the bridge circuit. A differential amplifier 18 is provided to receive a voltage developed across two junctions c and d of the bridge circuit. An output signal of the differential amplifier is applied to an inverted input terminal of the drive amplifier 14 via a switch 19 circuit which receives the Q output signal of the switch control circuit 16. In addition, a resistor $R_6$, which is connected between a negative input terminal of the differential amplifier 18 and an output terminal of the switch circuit 19, and a resistor $R_7$, connected between the output terminal of the switch circuit 19 and ground, form a feedback circuit of the drive amplifier 14.

The operation of the control servo system will be explained hereinafter.

In response to applying a 'focusing-on' signal, the starting signal generating circuit 17 applies a constant level driving signal to the drive amplifier 14. In this state, the level of the output signal of the comparator 15 remains low, and therefore, the state of the output signals Q and $\bar{Q}$ of the switch control circuit 16 are at low level and at high level respectively. Therefore, the servo loop switch 12 remains open at this stage and the servo loop is opened. In this state, the switch circuit 19 is closed. Accordingly, the coil $L_1$ has applied to it a drive current from the starting signal generation circuit 17. The drive coil $L_1$ is actuated at a level corresponding to the amplitude of the drive current applied to it.

If the bridge circuit is balanced, the differential amplifier 18 will receive only an induced voltage of the driving coil $L_1$, that is a voltage corresponding to the driving current applied to it. Therefore, while the switch circuit 19 is closed, a servo loop is formed through the differential amplifier 18, the drive circuit 14 and the bridge circuit. The servo loop operates to stabilize the speed of the movement of the focal lens which is driven by the driving coil $L_1$. In other words, the switch circuit 19 is closed to obtain a constant speed of the focal lens by means of the output signal Q of the switch control circuit 16 while the focus servo loop is turned off.

When the distance between the focal lens and the recording disc is reduced to a nominal value $D_o$, the level of the focus error signal will approach a level $E_1$ (generally being equal to zero), and the comparator 15 will produce an output signal.

In response to the generation of the output signal of the comparator 15, the servo loop switch 12 is turned on and the switch circuit 19 is turned off by the operation of the control switch 16. At the same time, the starting signal generator 17 is resetted. By this operation, the focus servo loop is turned on and the drive coil $L_1$ is applied with a driving current produced by the focus error signal. Thus, the lead in of the normal operation of the focus servo loop takes place.

However, in this conventional arrangement described above, there are several disadvantages, as mentioned before, such that the balancing of the bridge circuit is subject to change due to the temperature-resistance characteristics of the driving coil $L_1$ and due to the very small back electromotive force of the driving coil $L_1$.

Figure 2:
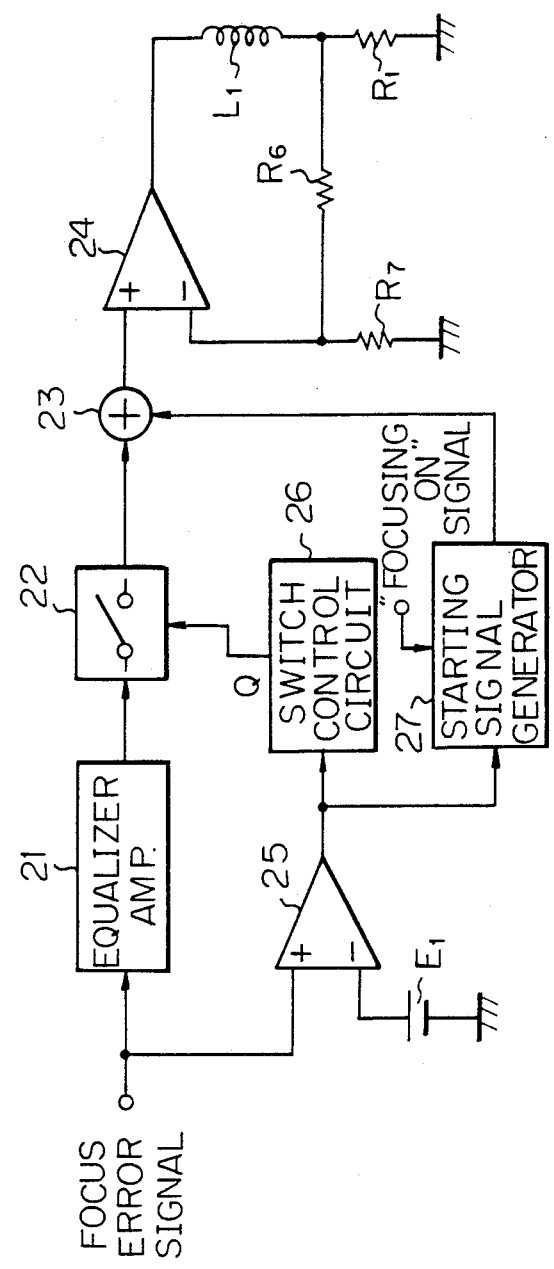
FIG. 2 is a block diagram of an embodiment of the device according to the present invention.

Referring to FIG. 2, the embodiment of the present invention will be explained.

As shown, a focus error signal from a photo detector is applied to an equalizer circuit 21 whose output signal is applied to a drive amplifier 24 via a servo loop switch 22 and an adder circuit 23. The focus error signal is also applied to a comparator 25 which also receives a reference level voltage $E_1$. An output signal of the comparator 25 is applied to a control switch 26 whose output signal Q is applied to the servo loop switch 22 to control the opening and closing operation thereof. The output signal of the comparator 25 is also applied to a starting signal generator circuit 27 which also receives a 'focusing-on' signal. An output signal of the starting signal generator 27 is applied to the adder circuit 23.

Furthermore, according to the present invention, the starting signal generator 27 takes the form of a ramp signal generating circuit in which the output ramp signal increases with time. Therefore, the ramp signal from the starting signal generator 27 is applied to the drive amplifier 24 when the servo loop switch 22 is opened.

Figure 3:
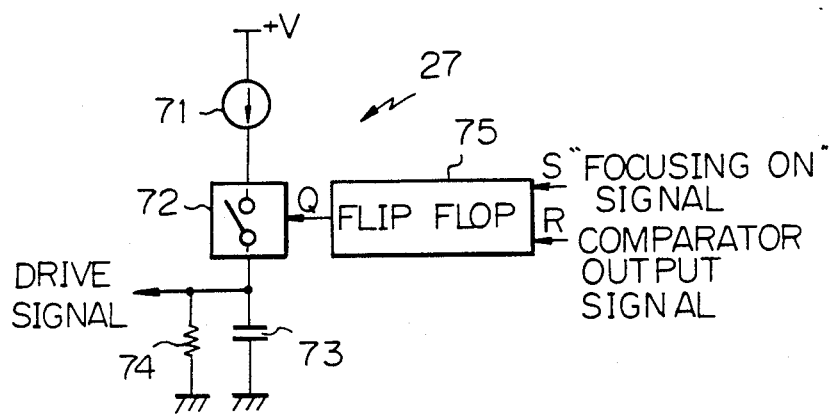
FIG. 3 is a circuit diagram of an example of the starting signal generator of the circuitry of FIG. 2.

FIG. 3 shows an example of the ramp signal generating circuit to be used as the starting signal generator 27. As shown, constant current from a constant current source 71 is applied to a parallel circuit of a capacitor 73 and a resistor 74, via a switch 72 so that the capacitor 73 is charged by a constant current. In order to control the operation of the switch 72, there is an R-S flip flop 75 which receives the 'focusing-on' signal at a set input terminal and the output signal of the comparator 25 at a reset input terminal. The switch 72 is closed by a high level output signal of the R-S flip flop 75 which develops at the Q output terminal, and the charging of the capacitor 73 is effected in this state. When a low level output signal is produced at the Q output terminal of the flip flop 75, the charging of the capacitor 73 is stopped and the electric charge in the capacitior 73 is gradually discharged through the resistor 74.

Figure 4:
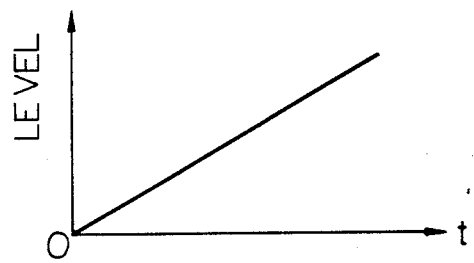
FIG. 4 is a waveform diagram of an output signal of the starting signal generator of FIG. 3.

FIG. 4 shows the wave form of the output signal of the starting signal generator 27. As shown, the level of the output signal of the starting signal generator 27 gradually increases with time, and consequently, the driving current of the drive coil $L^1$, increases with time.

Figure 5:
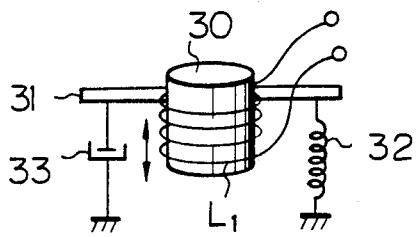
FIG. 5 is a diagram schematically showing the construction of the focus actuator to be adapted to the control device of the present invention.

FIG. 5 shows a schematic view of the focus actuator for moving the focal lens. As shown, the structure of the focus actuator is similar to a magnetic circuit of a speaker unit. The focal lens 30 is mounted in the drive coil $L_1$, which corresponds to a voice coil of a speaker unit and is placed in a predetermined magnetic field (not shown). In order to support the focal lens 30 and the drive coil $L_1$, there is provided a support member 31 which is supported by a resilient member 32 (being illustrated as a spring) and a damper member 33.

If no electric current flows through the drive coil $L_1$, then the position of the focal lens 30 is determined by the length of the resilient member 32. When the driving current is supplied to the drive coil $L_1$, the focal lens 30 is moved along the directions shown by the arrows against the resilient force of the resilient member 32. For a further description of the configuration and operation of the focus actuator, reference may be made to Japanese Utility Model application No. 56-75159 which was filed by the same applicant.

The relationship between the position x of the focal lens 30 and the driving current f(t) is given by the following equation:

$$m \frac{d^2x}{dt^2} + \alpha \frac{dx}{dt} + \beta x = f(t) - mg \quad (1)$$

in which m is the weight of the movable portions, $\alpha$ is the damping coefficient, $\beta$ is a spring coefficient, and g is the acceleration of gravity.

If the period of the change of the driving current is sufficiently large, then the terms of $d^2x/dt^2$ and $dx/dt$ can be neglected, and equation (1) can be modified as follows:

$$\beta x = f(t) - mg \quad (2)$$

Since in the present invention, the signal f(t) is a ramp signal, the signal f(t) is expressed as follows:

$$f(t) = at \quad (3)$$

in which a indicates a gradient of the ramp signal.

Therefore, the following equation (4) will be obtained from combining equations (2) and (3).

$$x = \frac{a}{\beta} t - \frac{m}{\beta} g \quad (4)$$

By differentiating equation (4), $$\frac{dx}{dt} = \frac{a}{\beta} \quad (5)$$

As seen from equation (5), the speed (dx/dt) of the movement of the focal lens is maintained constant if the driving current, expressed by equation (3), is applied to the driving coil $L_1$. In case a gradually increasing ramp signal cannot be produced, a charge-discharge output signal of a time constant circuit having a sufficiently large time constant can be used instead.

In view of the foregoing, it will be appreciated that in accordance with the present invention, it becomes possible to drive the focal lens at a constant speed without using complicated circuit for generating the driving current of the drive coil $L_1$. Further, the necessity of the adjustment of the circuit for generating the driving current is completely eliminated.

It should be understood that the foregoing description is for illustrative purpose only, and is not intended to limit the scope of the invention. Rather, there are numerous equivalents to the preferred embodiments, and such are intended to be covered by the appended claims. As an example, the focus actuator to which the control circuit according to the present invention is adapted, may be a driving device which drives the whole assembly of the pickup means including the optical system other than the focal lens such as a semiconductor laser source.

What is claimed is:

1. A device for controlling a focal point of a light beam for detecting recorded information, to be incorporated in an optical system for recording and reading out information comprising:
   a focal lens for focusing the light beam on a recording medium;
   resilient means for supporting said focal lens;
   focus actuator means including a drive coil connected to said focal lens, for moving said focal lens in accordance with a drive signal;

photo detector means for detecting said light beam from said recording medium and producing a focus error signal;

drive amplifier means for producing a drive current for said focus actuator means in proportion to the level of an input signal;

starting signal generating means responsive to a focusing-on signal for generating a starting signal whose level increases with time after receipt of said focusing-on signal;

comparator means for receiving said focus error signal and a reference level and producing an output signal when the level of said focus error signal passes said reference signal; and switching means connected to an input circuit of said drive amplifier means, for selecting said starting signal when said output signal of said comparator is not present, and selecting said focus error signal when said output signal of said comparator is present.

2. A device as set forth in claim 1, wherein said starting signal generating means comprises a charge-discharge circuit connected to a current source via a switch, and a set-reset flip flop circuit connected to said switch and receiving the focusing signal at a set input and receiving said output signal of said comparator means at a reset input thereof, so as to close said switch to charge the charge-discharge circuit upon receipt of said focusing-on signal, and open said switch to discharge said charge-discharge circuit when said output signal of said comparator means is applied thereto.

3. A device for controlling a focal point of a light beam for detecting recorded information, to be incorporated in an optical system for recording and reading out information comprising:

focal lens for focusing the light beam on a recording medium;

resilient means for supporting said focal lens and providing a balancing force substantially following the equation force $=\beta x$, where $\beta$ is a coefficient and x is the position of the focal lens from a position of rest;

focus actuator means including a drive coil connected to said focal lens, for moving said focal lens in accordance with a drive signal;

photo detector means for detecting said light beam from said recording medium and producing a focus error signal;

drive amplifier means for producing a drive current for said focus actuator means in proportion to the level of an input signal;

starting signal generating means responsive to a focusing-on signal for generating a starting signal whose level increases with time after receipt of said focusing-on signal;

comparator means for receiving said focus error signal and a reference level and producing an output signal when the level of said focus error signal passes said reference signal; and switching means connected to an input circuit of said drive amplifier means, and directly connected to and receiving the output of said comparator means, for selecting said starting signal when said output signal of said comparator is not present, and selecting said focus error signal when said output signal of said comparator is present.

* * * * *